(12) United States Patent
Morita et al.

(10) Patent No.: US 10,165,156 B2
(45) Date of Patent: Dec. 25, 2018

(54) IMAGE PROCESSING DEVICE

(71) Applicant: SHIMADZU CORPORATION, Kyoto-shi, Kyoto (JP)

(72) Inventors: Hisanori Morita, Kyoto (JP); Ryo Takeda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 21 days.

(21) Appl. No.: 15/543,680

(22) PCT Filed: Jan. 15, 2015

(86) PCT No.: PCT/JP2015/050986
§ 371 (c)(1),
(2) Date: Jul. 14, 2017

(87) PCT Pub. No.: WO2016/113888
PCT Pub. Date: Jul. 21, 2016

(65) Prior Publication Data
US 2018/0270401 A1  Sep. 20, 2018

(51) Int. Cl.
*H04N 5/21* (2006.01)
*G06K 9/40* (2006.01)
(Continued)

(52) U.S. Cl.
CPC ............ *H04N 5/21* (2013.01); *G06K 9/40* (2013.01); *G06T 5/002* (2013.01); *G06T 5/50* (2013.01)

(58) Field of Classification Search
CPC .......... H04N 5/21; H04N 5/211; H04N 5/272; H04N 9/74; H04N 9/646; H04N 9/77;
(Continued)

(56) References Cited

U.S. PATENT DOCUMENTS

| 6,535,617 B1* | 3/2003 | Hannigan | G06K 7/1417 |
| | | | 348/615 |
| 7,970,227 B2* | 6/2011 | Saito | H04N 5/23248 |
| | | | 348/607 |
| 8,059,203 B2* | 11/2011 | Sasai | H04N 5/21 |
| | | | 348/607 |

FOREIGN PATENT DOCUMENTS

| JP | H01-314477 | 12/1989 |
| JP | 9-56707 | 3/1997 |

(Continued)

OTHER PUBLICATIONS

PCT/JP2015/050986, ISR and Written Opinion, dated Apr. 14, 2015, 7 pages—Japanese; 2 pages—English.

*Primary Examiner* — Sherrie Hsia
(74) *Attorney, Agent, or Firm* — Andrew F. Young, Esq.; Lackenbach Siegel, LLP

(57) ABSTRACT

With the present invention, it is possible to provide an image processing apparatus capable of reliably removing noise, even for a live image having a poor S/N ratio. The present invention has a configuration to search for where, on a frame F0, a target block BT is reflected. When superimposing the frame F0 and a frame F1, the target block BT, which is a fragment of the frame F0, and a plurality of blocks to be superimposed, which is a fragment of the frame F1 are set, and if, from fusion blocks BF generated by superimposing the target block BT on each of the blocks to be superimposed BR, a selection block BS is selected wherein superimposed subject images most reinforce one another, it is possible to reliably suppress duplication of the subject images.

10 Claims, 11 Drawing Sheets

(51) Int. Cl.
*G06T 5/00* (2006.01)
*G06T 5/50* (2006.01)

(58) Field of Classification Search
CPC .. G06K 9/40; G06T 5/02; G06T 5/001; G06T 5/50
USPC ......... 348/607, 624, 578, 599, 598; 382/275
See application file for complete search history.

(56) References Cited

FOREIGN PATENT DOCUMENTS

| | | |
|---|---|---|
| JP | 2007-235319 | 9/2007 |
| JP | 2013-201724 | 10/2013 |

* cited by examiner

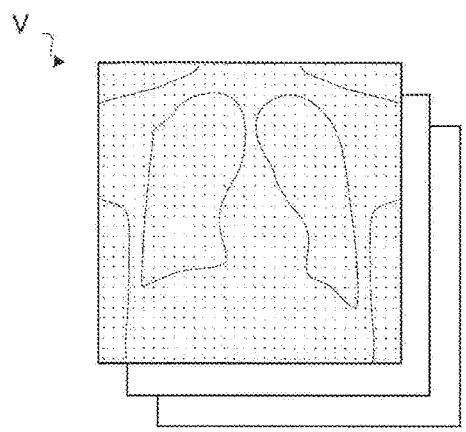 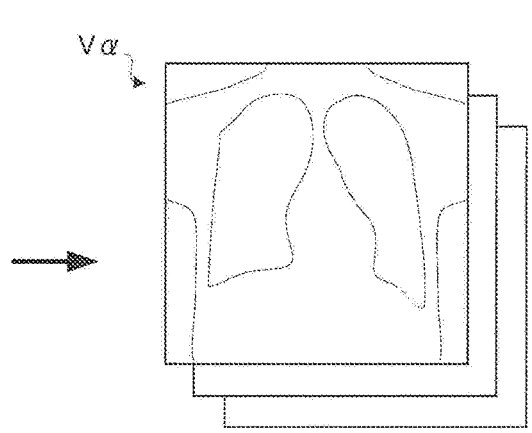
*FIG. 1A*  *FIG. 1B*

*FIG. 10*

| | | |
|---|---|---|
| Generate F0 | | |
| Generate F1 | Generate F1α based on F0, F1 | 1st time |
| Generate F2 | Generate F2α based on F1, F2 | 2nd time |
| Generate F3 | Generate F3α based on F2, F3 | 3rd time |
| ⋮ | | |
| Generate Fn | Generate Fnα based on Fn-1, Fn | n time |

IMAGE PROCESSING DEVICE

CROSS REFERENCE TO RELATED APPLICATIONS

This application relates to, and claims priority from Ser. No.: PCT/JP2015/050986 filed Jan. 15, 2015, the entire contents of which are incorporated herein by reference.

BACKGROUND OF THE INVENTION

Field of the Invention

The present invention relates to an image processing device to remove noise superimposed on a radiation image and particularly relates to the image processing device that improves quality of the image of each frame constituting a live image.

Background

A medical facility equips a radiation imaging device to acquire the radiation image. Some radiation imaging device (radiographic device) can continuously take the radiation images and then output the results as a video. Such video is sometime called a live image (e.g., refer to Patent Document 1).

Such live image is obtained by irradiating a low-dose radiation to a subject, so that the S/N ratio of the image is inferior to the S/N ratio of the image by a static imaging (spot imaging) and a lot of noises are included therein. A radiographic imaging device equips an image processing device that reduces such noise. Such an image processing device can structurally provide the noise reduction image having the S/N ratio improved by superimposing two continuous frames with time.

Meanwhile, the live image is a video catching the movement of the subject. Accordingly, if the images are simply superimposed one another, a noise reduction image of which the subject images are as if doubled is generated. The reason is that the incorporated position and shape of the subject are different from each other between two images. In addition, the level of misalignment between the subject's images per se varies depending on the portion of the image, so that even if one frame is just shifted relative to another frame to be superimposed, doubling of the images cannot be prevented. Relative to the subject image of the live image, a portion of the image coincides or does not coincide with a certain portion of the other image between frames. Relative to the coincident portions, just simple superimposing reduces the noise. The not-coincident portions, however, provide a misaligned image of the subject.

Therefore, according to the conventional aspects, a variety of devices is adopted to prevent such image doubling. For example, according to the aspect of Patent Document 1, the place of the superimposition target image, corresponding to each pixel in the frame, is examined by an image analysis and then an operation that superimposes the pixel in the frame and the corresponding pixel in the superimposition target image thereto is executed. Accordingly, the structure in the frame and the structure in the superimposition target image can be superimposed while aligning each position.

RELATED PRIOR ART DOCUMENTS

Patent Document

Patent Document 1: JP Patent Published H1-314477

ASPECTS AND SUMMARY OF THE INVENTION

Objects to be Solved

However, following problems remain in the conventional aspects set forth above.

Specifically, according to the conventional aspects, the images cannot be accurately superimposed.

Specifically, according to the aspect of Patent Document 1, an error recognition of the corresponding pixel takes place often because one pixel of the superimposition target image, corresponding to one pixel in the frame, is searched by comparing one pixel of the superimposition target image relative to one pixel in the frame one at a time. Under such circumstance, the images are not superimposed correctly to each other, so that no noise reduction image having a high-visual recognition level can be obtained.

The method according to the aspect of the Patent Document 1 is not appropriate as for the frame incorporating a noise component strongly in particular. When the S/N ratio of the frame worsens, noise elimination cannot be achieved. The inventor sets forth the principle therefor. According to the aspect of the Patent Document 1, a pixel value that resembles the pixel value in the extremely narrow region in the frame (e.g., one pixel) is searched from the superimposition target image, and such found pixel value is superimposed. Therefore, according to the method of the Patent Document 1, an image processing implements a superimposition in which a whitish part of the superimposition target image is superimposed to the whitish part incorporated in the frame. Specifically, according to the method of the Patent Document 1, the superimposition target images are superimposed while keeping the resemblance to the image in the frame, so that the image processing is unable to change boldly (extremely) the pixel value in the frame.

When a strong noise is superimposed in the frame and to the superimposition target image, the image processing that changes boldly the pixel value in the frame is important in some cases. For example, it is given that the whitish part to be incorporated as whitish in the frame is rather darkish due to the effect of the strong noise. From noise reduction standpoints, an image processing is needed to thin the noise in the frame by superimposing the whitish part, having no-noise superimposition, to the darkish part in the frame relative to the superimposition target image. The method according to the Patent Document 1, however, does not change boldly the pixel value in the frame system-wise. Accordingly, the method according to the Patent Document 1, even a measure that searches out a darkish part from somewhere in the superimposition target image to superimpose the darkish part of the frame is implemented. Consequently, the strong noise in the frame remains as-is without thinning.

An appearance of the noise varies and fluctuates depending on the location in the image. Therefore, if the image superimposition is implemented based on a pattern matching by improving the method according to the Patent Document 1, even such strong noise can be canceled. The pattern matching is a technology by which an image resembling an image incorporated in the frame having some extent is searched from the superimposition target image. Even if the pixel values between a certain pixel in the frame and the corresponding pixel thereto in the superimposition target image is largely different due to the superimposition of sever noise, the effect on the homologous assessment of the pattern matching is limited. Accordingly, superimposition of images can be implemented so that the pixel value of one pixel is boldly changed. The noise, however, is further stronger, and when the noise amplitude is more frequently larger than the difference of pixel values between the attention region of the subject and the periphery thereof, the accuracy of the result of the pattern matching is being worsen. Relative to the pattern matching, the effect of noise can be weakened by averaging the comparison results of multiple pixels, but when the accuracy of the comparison results of each pixel is largely damaged, the averaging is getting unworkable.

Considering such circumstances, the purpose of the present invention is to provide an image processing device that can remove absolutely noises in each frame forming a live image.

Means for Solving the Problem

The present invention comprises the following structures to solve the above problem.

Specifically, an image processing device of the present invention that is the image processing device capable of processing a noise reduction of an original image by superimposing the original image generated by continuously imaging a subject with time and a superimposition target image comprises: a target setting means that sets up a target block, which is one of multiple target blocks, by dividing at least one part of a region of the original image to the multiple blocks; a superimposition target setting means that sets up multiple superimposition target blocks, having the same shape and size as the set-up target blocks, in the different location in the superimposition target image from each other; a superimposition means that generates a fusion block by superimposing a target block to the respective superimposition target blocks; a selection means that selects a selection block from the multiple fusion blocks, wherein the superimposed subject images are most strengthened each other; an image generation means that generates a noise reduction image by connecting the selection blocks generated in the respective multiple blocks.

Action and Effect

According to the aspect of the present invention, an image processing device capable of removing absolutely noises despite a live image having a poor S/N ratio can be provided. Specifically, the image processing device of the present invention sets up a target block, which is a part of the original image, and multiple superimposition target blocks, which are parts of the superimposition target image, when the original image and the superimposition target image are superimposed; and selects a selection block, in which the subject images are most strengthen each other among the fusion blocks generated by superimposing the target blocks to the superimposition target blocks respectively. Then, according to the aspect of the present invention, a noise reduction image is generated by connecting multiple selection blocks. In such way, given searched out where the target block is incorporated in the superimposition target image, the respective images can be superimposed each other while tracking the subject image in the original image, so that the superimposition target image is not superimposed to the original image due to an erroneous recognition.

Particularly, according to the aspect of the present invention, a selection means selects a selection block from the fusion blocks, wherein the superimposed subject images are most strengthened each other. Accordingly, it is advantageous differently from the conventional method.

Specifically, the conventional method may not work well when the S/N ratio of the original image is poor. According to the conventional method, the measure to change boldly the pixel values of the original image is not available. Therefore, the superimposition of respective images is completed while the strong noise in the original image remains as-is. In addition, even if a pattern matching is applied to cancel the noise in the original image absolutely, the accuracy may be poor when the amplitude of the noise is strong.

According to the present invention, the superimposition target blocks paring with the target block are selected using the benchmark that indicates whether the subject image can be clear based on the superimposition, so that it can be determined whether the subject images are superimposed under the condition in which the noise is reduced. Specifically, the aspect of the present invention is particularly effective on the noise reduction processing relative to the live image having a poor S/N ratio.

In addition, it is preferable that the selection means, relative to the above image processing device, calculates the value indicating a contrast relative to the respective fusion blocks, calculates the strengthening level of the superimposed subject images each other by comparing the respective values, and then selects the selection blocks.

Action and Effect

The above aspects illustrate the specific aspects of the present invention. When calculate the value indicating the contrast relative to the respective fusion blocks and compare the respective values to select the fusion block, the selection means selects absolutely the fusion blocks that most strengthen the superimposed subject images each other from multiple fusion blocks. The fusion blocks that are generated by superimposing the blocks one another incorporating the subject images different from each other have a low-contrast. The reason is that the subject images different from each other weakens one another when superimposing. In contrast, the fusion blocks that are generated by superimposing the blocks one another incorporating the same subject images have a high-contrast. The reason is that the same subject images strengthen one another when superimposing. In such way, when compare the fusion blocks using contrast, the selection of the fusion blocks is facilitated.

In addition, it is more preferable that the selection means, relative to the above image processing device, calculates a feature quantity utilizing differentiation relative to the respective fusion blocks, calculates the strengthening level of the superimposed subject images one another by comparing the feature quantities, and then selects the selection blocks.

Action and Effect

The above aspects illustrate the specific aspects of the present invention. When calculate the feature quantity utilizing the differential value relative to the respective fusion blocks and compare the respective values to select the fusion block, the selection means selects absolutely the fusion blocks that most strengthen the superimposed subject images each other from multiple fusion blocks. The sum of the differential values obtained by differentiating the fusion blocks that are generated by superimposing the blocks one another incorporating the subject images different from each other relative to multiple pixel included in the fusion blocks is small. The reason is that the subject images different from each other weakens one another when superimposing and the image are unfocused (blur). In contrast, the sum of the differential values obtained by differentiating the fusion blocks that are generated by superimposing the blocks one another incorporating the same subject images relative to multiple pixel included in the fusion blocks is large. The reason is that the same subject images strengthen one another when superimposings are focused (sharp). In such way, when compare the fusion blocks using the differential values, the selection of the fusion blocks is facilitated.

In addition, it is more preferable that the selection means, relative to the above image processing device, calculates a feature quantity utilizing a filter (image) processing relative to the respective fusion blocks, calculates the strengthening level of the superimposed subject images one another by comparing the feature quantities, and then selects the selection blocks.

Action and Effect

The operation of the selection means according to the aspect of the present invention is not limited to implementation of the differentiation processing on the fusion blocks, and also the filter processing brings the operation into reality. According to the present invention, the aspects of the present invention can be changed corresponding to the specific requirement while constructing the device.

In addition, relative to the image processing set forth above, it is more preferable that the superimposition target image, which is one of images continuously taken, is the image one image after the original image.

In addition, relative to the image processing set forth above, it is more preferable that the superimposition target image, which is one of images continuously taken, is the image one image after the original image and a noise reduction image corresponding thereto.

Action and Effect

The above aspects illustrate the more specific aspects of the present invention. The present invention is applicable to a variety of aspects relative to noise reduction processings.

In addition, relative to the image processing set forth above, it is more preferable that the target setting means sets up a rectangular target block by dividing the original image vertically and horizontally.

Action and Effect

The above aspects illustrate the more specific aspects of the present invention. Given setting the rectangular target block by dividing the original image vertically and horizontally, setting of the target block can be executed so that multiple fusion blocks absolutely fill up the original image.

In addition, it is more preferable that the target block set up by the target setting means is square.

Action and Effect

The above aspects illustrate the more specific aspects of the present invention. When the target block is square, the processing of the image processing device according to the present invention is more simplified.

In addition, relative to the image processing set forth above, it is more preferable that the superimposition target setting means sets up the region at which the center thereof is the location corresponding to the target block in the superimposition target image, sets up the superimposition target blocks while paying attention to the part having the same shape as the target block belonging to the region, and then after sets up one continuously the superimposition target blocks while changing the part in the region.

Action and Effect

The above aspects illustrate the more specific aspects of the present invention. When the operation is setting up the region at which the center thereof is the location corresponding to the target block in the superimposition target image, setting up the superimposition target blocks while paying attention to the part having the same shape as the target block belonging to the region, and then after setting up one continuously the superimposition target blocks while changing the part in the region, the setting of the superimposition target blocks can be more absolutely executed.

In addition, relative to the image processing set forth above, it is more preferable that the image generation means is operable to execute connection by arranging the selection blocks in accordance with the locational data of the target block corresponding to the selection block.

Action and Effect

The above aspects illustrate the more specific aspects of the present invention. When the image generation means is operable to execute connection by arranging the selection blocks in accordance with the locational data of the target block corresponding to the selection block, the selection block is arranged in the same array as the target block of the original image to generate the noise reduction image, so that the noise reduction image is the image in which only noise is absolutely removed from the original image.

Effect of the Invention

According to the aspect of the present invention, an image processing device capable of removing absolutely noises despite a live image having a poor S/N ratio can be provided. Specifically, according to the aspect of the present invention, the location of the target block incorporated in the original image is searched. When the image processing device of the present invention sets up a target block, which is a part of the original image; and multiple superimposition target blocks, which are parts of the superimposition target image, when the original image and the superimposition target image are superimposed; and selects a selection block, in which the subject images are most strengthen respectively, from the fusion blocks generated by superimposing the target blocks to the superimposition target blocks respectively; a doubling of the subject image can be absolutely prevented.

BRIEF DESCRIPTION OF THE DRAWINGS

FIGS. 1A, 1B are schematic diagrams illustrating an aspect of an image processing device of the present invention.

FIG. 10 is a schematic diagram illustrating repetition of an operation of the image processing device of the present invention.

DETAILED DESCRIPTION OF THE PREFERRED EMBODIMENTS

Figure 2:
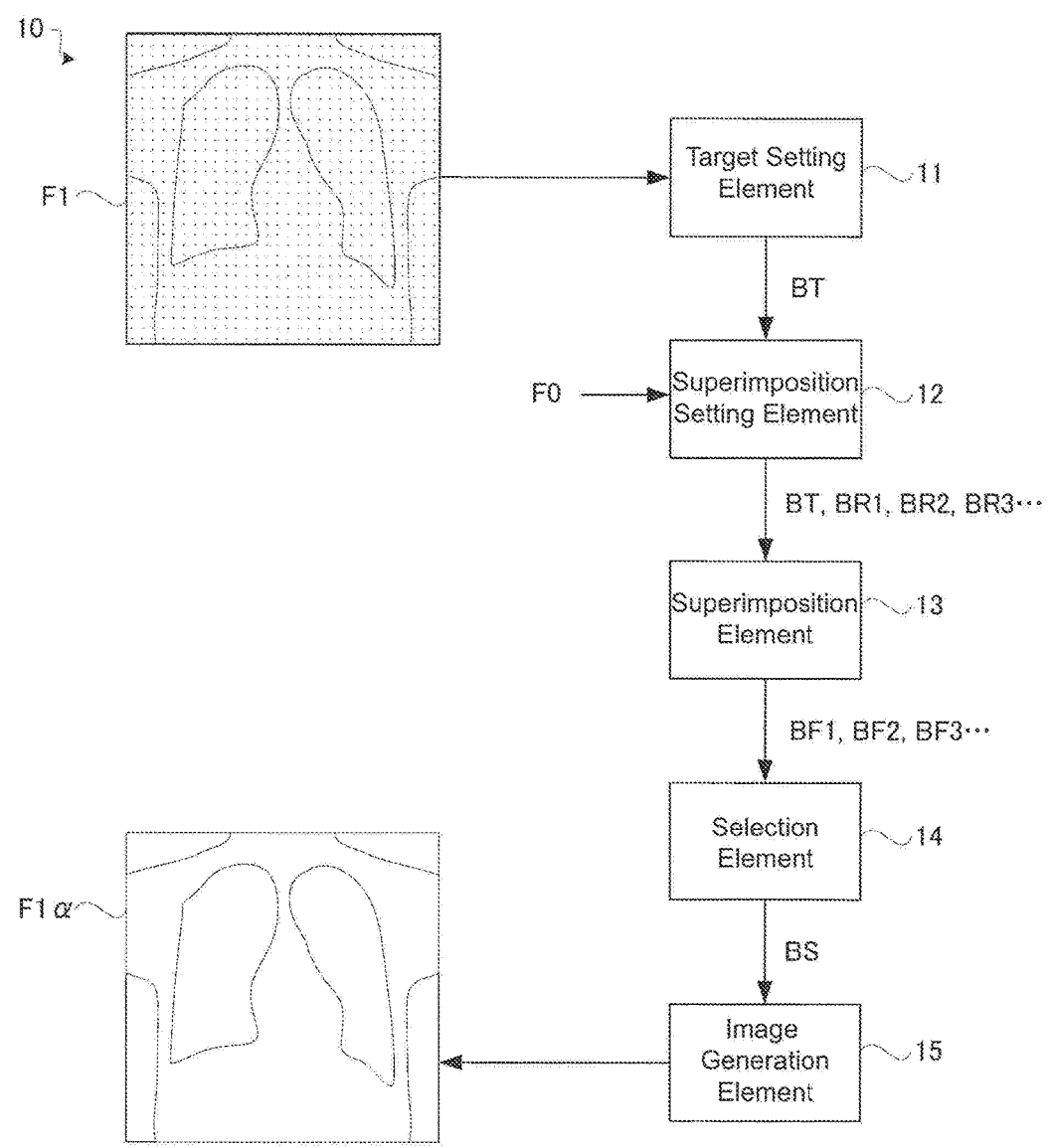
FIG. 2 is a functional block diagram illustrating the total structure of the image processing device according to the aspect of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements, modules or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

It will be further understood by those of skill in the art that the apparatus and devices and the elements herein, without limitation, and including the sub components such as operational structures, circuits, communication pathways, and related elements, control elements of all kinds, display circuits and display systems and elements, any necessary driving elements, inputs, sensors, detectors, memory elements, processors and any combinations of these structures etc. as will be understood by those of skill in the art as also being identified as or capable of operating the systems and devices and subcomponents noted herein and structures that accomplish the functions without restrictive language or label requirements since those of skill in the art are well versed in related devices, computer and operational controls and technologies of radiographic devices and all their sub components, elements, modules, and programs, including various circuits, elements, and modules, and combinations thereof without departing from the scope and spirit of the present invention.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

An image processing device 10 implements a noise reduction processing on an original image by superimposing an original image, which belongs to the time-series images generated by continuously imaging a subject, and a superimposition target image. Next, the inventor sets forth the structure of the image processing device 10 according to the aspect of the Embodiment. In addition, the frame F0 is the original image of the present invention and the frame F1 is a superimposition target image of the present invention.

Embodiment 1

The inventor sets forth the structure of an image processing device 10 of the present invention. The image processing device 10 of the present invention is a device that is used to reduce noise of a live image. Live imaging is a sort of X-ray imaging and the purpose thereof is to provide the fluoroscopic images as a video, so that the live images are the video. With regard to such live imaging, the subject is exposed to X-rays for a long time, so that X-ray dose administered for imaging is controlled relatively lower to suppress the radiation exposure dose to the subject. Accordingly, the live image is prone to an inferior S/N ratio due to a statistical noise.

Referring to FIG. 1A, 1B, once the live image V is input to the image processing device 10 of the present invention, the noise reduction video Vα, of which the noise is reduced, is output from the live image V. At this time, the image processing device 10 executes an image processing every frame constituting the live image so that the noise is reduced from each frame, and generate the noise reduction video Vα by connecting the time-series live images in order. The image processing that the image processing device 10 executes is to reduce the noise on the frame by offsetting noises, which appear randomly in each frame, by superimposing a certain frame and the frame imaged one frame before the certain frame. In such way, the noises illustrated as dot-lines in the live image V in FIG. 1A are reduced, so that the noise reduction video Vα having an improved visibility is generated.

FIG. 2 is a functional block diagram illustrating the structure of the image processing device 10 of the present invention. FIG. 2 illustrates one Embodiment of the operative image processing based on the frame F1 and the frame F0. The image processing device of the present invention is operative to execute the image processing based on any frame Fm constituting the live image and the frame Fm−1 which is imaged just one frame before the frame Fm as well as FIG. 2.

Referring to FIG. 2, the inventor briefly sets forth the frame F0 and the frame F1 as illustrated referring to FIG. 2. The frame F0 is the first frame acquired once the imaging of the live image begins and the frame F1 is the first frame imaged following the frame F0. Accordingly, the imaging of the frame F0 and the imaging of the frame F1 are time-oriented and adjacent each other.

In addition, here, the inventor sets forth the frames that are the time-oriented and adjacent each other, but it is not mandatory to be the time-oriented and adjacent and other frames can be sandwiched. For example, arbitrary frames Fm and Fm−k (m>K>1) are used for the processing.

Figure 3A:
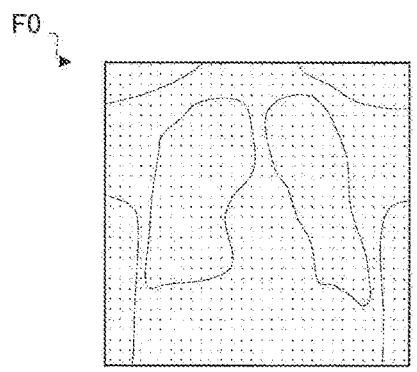
FIGS. 3A, 3B are schematic diagrams illustrating original images of the present invention.
Figure 3B:
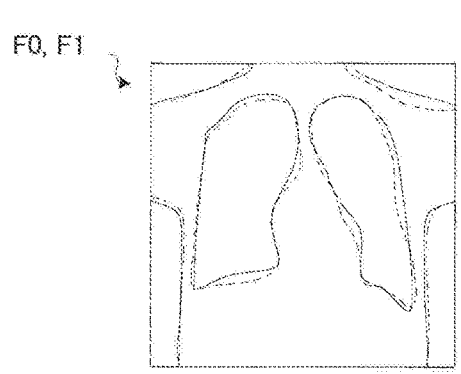

FIG. 3A illustrates the frame F0 as an example. The frame F0 is the similar image to the frame F1 illustrated in FIG. 2. Referring to FIG. 3B, with regard to live imaging, the subject is imaged by a video, so that the subject image being incorporated in the frame F0 and the image being incorporated in the frame F1 are not exactly the same images. The reason is that the target subject to be imaged moves between imaging the frame F0 and imaging the following frame F1. The subject image being incorporated in the frame F0 is similar to the subject image being incorporated in the frame F1. The position of the subject being incorporated in the frame F0 is different from the position of the subject being incorporated in the frame F1. Further, the shapes of the subject image being incorporated in each frame F1, F0 are similar but not exactly the same.

In addition, the frame F0 as well as the frame F1 includes noise. When noise components based on each frame are compared, the appearance pattern thereof is different from each other. Accordingly, it is supposed that given the frame F0 and the frame F1 are superimposed, the noise component included each frame F0, F1 could be offset and the image having superior visibility could be generated. The reason is that it is predicted that the subject images included the frames are strengthened but, in contrast, the noise included in the frames are weakened when the frames F0, F1 are superimposed. Referring to FIG. 3B, when the frames F0, F1, however, are just simply superimposed, the subject images incorporated in each frame F0, F1 are superimposed with misalignment each other. Specifically, even when noise components are certainly offset by superimposition processing, but the visibility of the subject image is likely tainted.

It is necessary that the subject images should be superimposed to suppress such misalignment of the subject upon superimposing each frame F0, F1 while dividing the frame F1 to small segments (target blocks BT) and shifting the frame F0 every target block BT. Each element 11, 12, 13, 14, 15 is installed for the purpose of bringing such operation into reality. Hereafter, the inventor sets forth the specific operation of each element 11, 12, 13, 14, 15 in order.

<Operation of the Target Setting Element 11>

Figure 4:
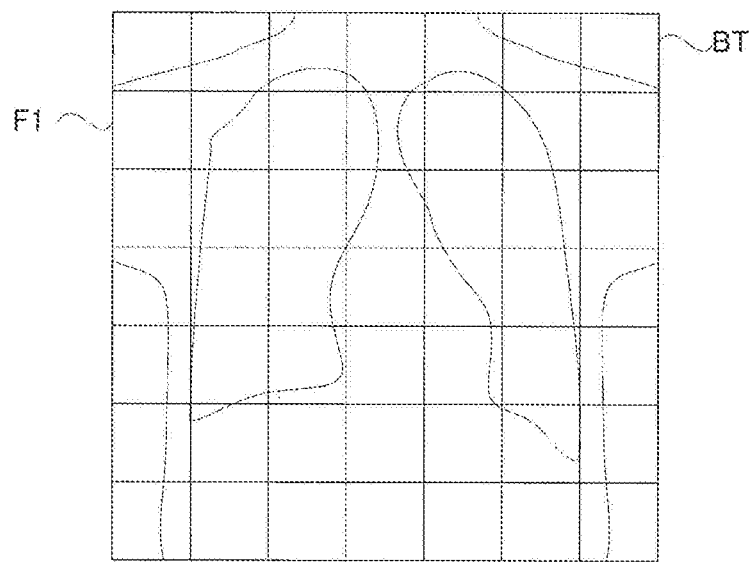
FIG. 4 is a schematic diagram illustrating an operation of a target setting element of the present invention.

FIG. 4 illustrates the operation of the target setting element 11 of the Embodiment 1. The target setting element 11 sets up rectangular target blocks BT1, BT2, BT3, . . . , BTend by dividing vertically and horizontally the frame F1 imaged later. According to the explanation of FIG. 4, for convenience of explanation, the blocks are shown as if tiles without overlapping, but the aspect of Embodiment 1 is not limited thereto and the target blocks can be overlapped. Square shape as a shape of the target block can be selected. The target setting element 11 corresponds to the target setting means of the present invention. In such way, the target setting element 11 divides at least one part of the region of the frame F1 incorporating the subject image to multiple blocks, and sets up one of the multiple blocks to a target block BT. The target block BT is one square region having no enclave in the frame F1 and multiple pixels belong thereto.

<Operation of the Superimposition Target Setting Element 12>

The locational data relative to the target blocks BT1, BT2, T3, . . . , BTend set up by the target setting element 11 is sent out to the superimposition target setting element 12. The superimposition target setting element 12 implements the same operation to the target blocks BT1, BT2, T3, . . . , BTend. Hereafter, the following explanation illustrates the operation of the superimposition target setting element 12 on the target block BTm. The superimposition target setting element 12 corresponds to the superimposition target setting means of the present invention.

Figures 5A, 5B:
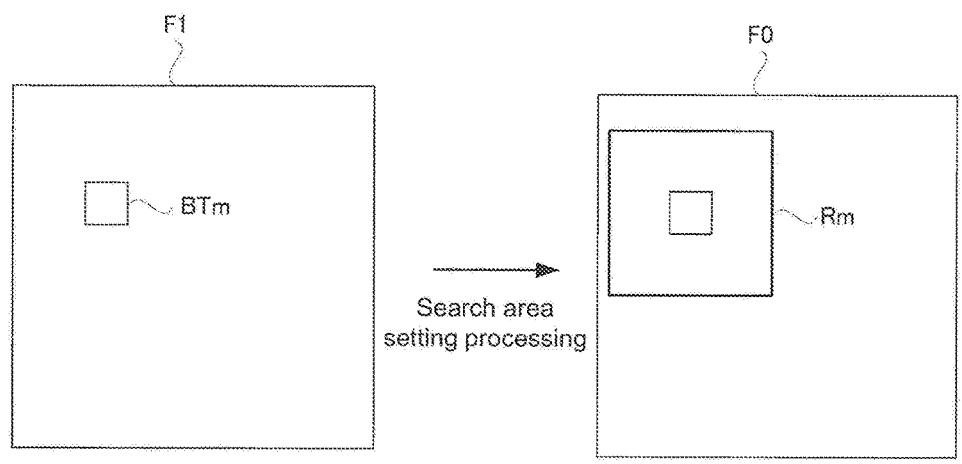
FIGS. 5A, 5B are schematic diagrams illustrating an operation of a superimposing target setting element of the present invention.

FIG. 5A, 5B are illustrating the aspect in which the superimposition target setting element 12 sets the region Rm corresponding to the target block BTm in the frame F0. The superimposition target setting element 12 sets a rectangular region in the frame F0, of which center is the location corresponding to the target block BTm, and of which size is larger than the target block BTm, Accordingly, such rectangular region is set up in the frame F0. Such set region is called the search region Rm. The region Rm is the region specified as the target block BTm, The inventor sets forth the method to determine the size of the region Rm. The frame F0 and the frame F1 are the images continuously imaged, so that change between the incorporated subject images is not much big. When the shifting of the subject image is actually measured in advance, it can be known how much the shifting of the subject image between frames F0 and F1 is vigorous. For example, given imaging incorporates a heart, the size of the heart in the image is approximately fixed in the image. Accordingly, when it is measured how many number of pixels have been shifted between the live image frame F0 and F1 imaged in the past, the shifting distance of the target block BT in the frame F1 of the current imaging can be predicted in some degree. Accordingly, the region Rm is determined based on the shifting distance of the subject image obtained by the actual measurement result. Specifically, the region Rm is set well larger than the region indicated by the actual measurement results so that the destination of the target block BT predicted by the actual measurement result is absolutely included.

In addition, the shift distance of the subject images incorporated in both frames F0 and F1 increases along with the frequency of the continuous imaging that is becoming sparse. Accordingly, the region Rm is set to be larger gradually along with decreasing of the framing rate.

Figures 6A, 6B, 6C:
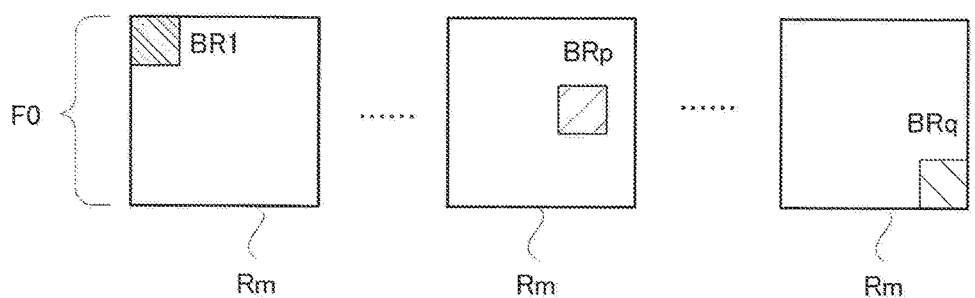
FIGS. 6A-6C are schematic diagrams illustrating an operation of a superimposing target setting element of the present invention.

FIG. 6A-6C are illustrating the aspect in which the superimposition target setting element 12 sets up the superimposition target blocks in the region Rm. The superimposition target setting element 12 designates the rectangular part having the same shape and size as the target block BT belonging to the the region Rm as the superimposition target block BR. Subsequently, the superimposition target setting element 12 continuously sets the superimposition target blocks BR while changing the position of such part in the region Rm per pixel in either longitudinal or lateral direction. FIG. 6A-6C are illustrating the mode in which a plurality of the superimposition target blocks BR1, . . . , BRp, . . . , BRq are being set while such part is shifting from the top end of the left side to the bottom end of the right side in the region Rm. In such way, the superimposition target setting element 12 sets up the plurality of the superimposition target blocks BR that are in the different locations from each other are in the frame F0 in which the subject is incorporated in the different location from the location in the frame F1. Accordingly, the plurality of the superimposition target blocks BR are overlapped one another.

<Operation of the Superimposition Element 13>

Figure 7A:
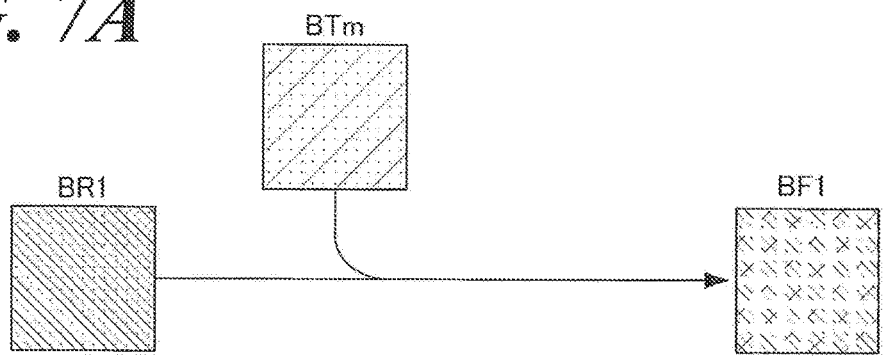
FIGS. 7A-7C are schematic diagrams illustrating an operation of a superimposing setting element of the present invention.
Figure 7B:
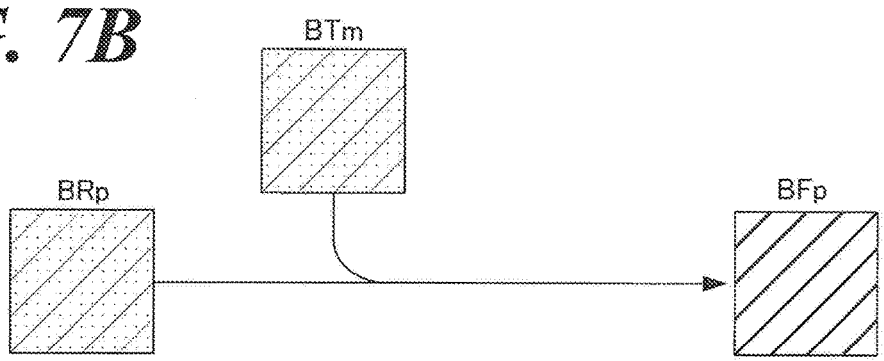
Figure 7C:
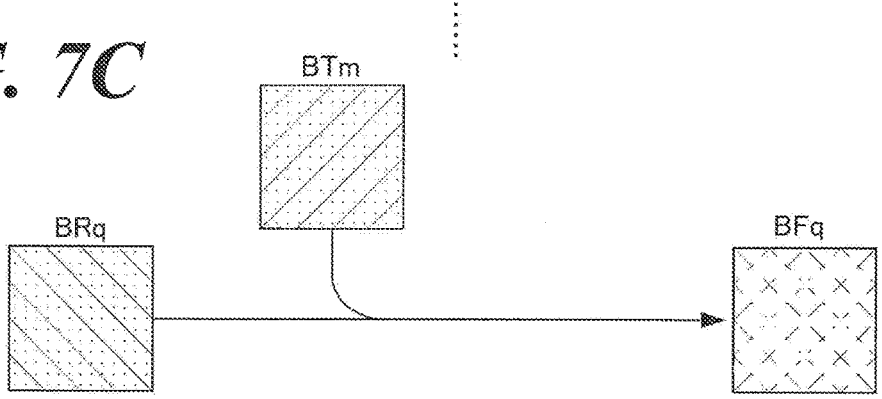

The target blocks BTm set by the target setting element 11 and the plurality of the superimposition target blocks BR1, . . . , BRp, . . . , BRq set by the superimposition target setting element 12 are sent out to the superimposition element 13. Referring to FIG. 7A-7C, the superimposition element 13 implements the operation by which the target blocks BTm are superimposed to the respective superimposition target blocks BR1, . . . , BRp, . . . , BRq. Therefore, fusion blocks BF1, . . . , BFp, . . . , BFq corresponding to the respective superimposition target blocks BR1, . . . , BRp, . . . , BRq are generated. The specific method of the operation of the superimposing blocks, which the superimposition element 13 implements, comprise steps of averaging the pixel values of the respective pixels in the same location relative to each superimposition target block, and generating the new block by placing the obtained average value to the location corresponding to such pixel.

Referring to FIG. 7A-7C, the noise component of the target blocks BTm, indicated by the hatching, and the noise component of the superimposition target blocks BR1, . . . , BRp, . . . , BRq, also indicated by the hatching are canceled. Consequently, the noise components of the fusion blocks BF1, . . . , BFp, . . . , BFq are reduced. The superimposition element 13 corresponds to the superimposition means of the present invention. In such way, the superimposition element 13 generates the fusion blocks BF in which the subject images incorporated in both blocks are superimposed by superimposing the target blocks BT to the superimposition target blocks BR respectively.

[Operation of the Selection Element 14]

The fusion blocks BF1, . . . , BFp, . . . , BFq are sent out to the selection element 14. Such fusion blocks BF1, . . . , BFp, . . . , BFq are formed by superimposing the part of the frame F0 (target block BT) and a part of the frame F1 (superimposition target blocks BR1, . . . , BRp, . . . , BRq).

The difference between the fusion blocks BF1, . . . , BFp, . . . , BFq is the locational difference in the frame F0 of the superimposition target block. Therefore, among the fusion blocks BF1, . . . , BFp, . . . , BFq, some subject images are incorporated doubly and others are incorporated are rightly superimposed. The selection element 14 selects the subject images, which are rightly superimposed, from the fusion blocks BF1, . . . , BFp, . . . , BFq and sets such images as the selection block BSm. The selection element 14 corresponds to the selection means of the present invention.

Figure 8A:
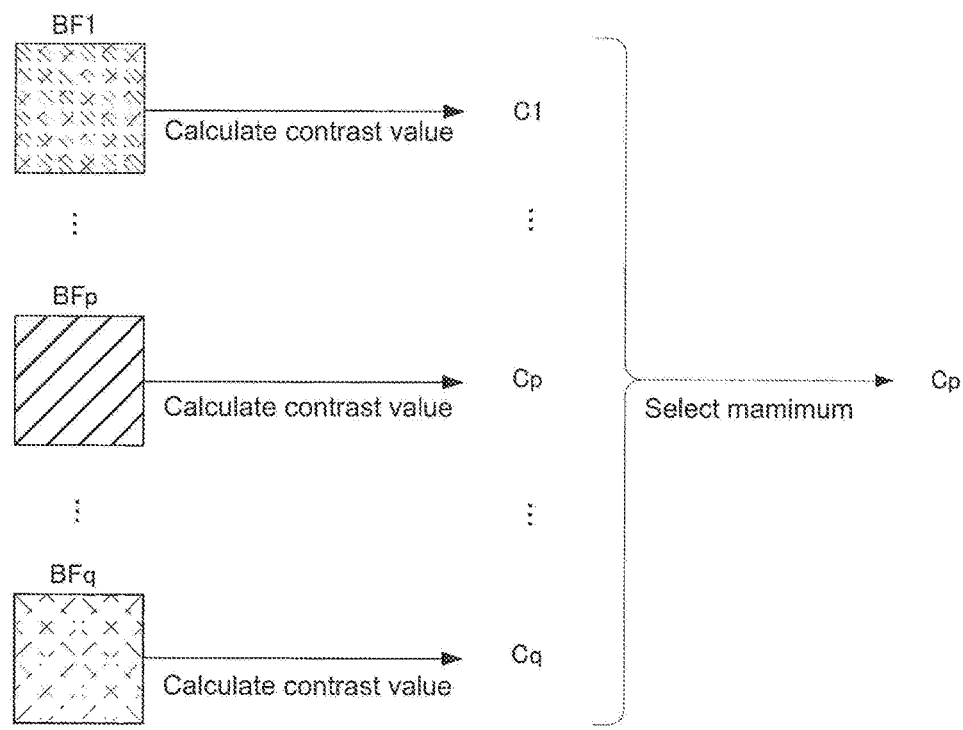
FIGS. 8A, 8B are schematic diagrams illustrating an operation of a selection element of the present invention.
Figure 8B:
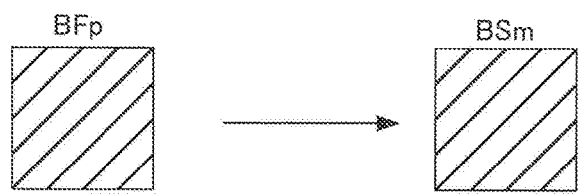

FIG. 8A, 8B are illustrating the operation of the selection element 14. The selection element 14 calculates a contrast value C relative to the respective fusion blocks BF1, . . . , BFp, . . . , BFq. The following mathematical formula, for example, is applied to calculated the contrast value C.

$$C=(P\max-P\min)$$

Pmax is the maximum value of the pixel values of the pixels forming the fusion blocks BF, and Pmin is the minimum value of the pixel values of the pixels forming the fusion blocks BF. Then, the selection element 14 searches out the maximum value among the contrast values C1, . . . , Cp, . . . , Cq corresponding to the respective fusion blocks BF1, . . . , BFp, . . . , BFq by comparing each contrast value. Subsequently, referring to FIG. 8B, the selection element 14 sets up the fusion block BFp, which corresponds to the searched-out maximum contrast value Cp, as the selection block BSm. In such way, the selection element 14 completes the selection of the fusion block BF.

The selection element 14 selects the selection block BSm, in which the subject image originated in the target block BTm and the subject image originated in the superimposition target block BRm are rightly superimposed and incorporated, from the fusion blocks BF by such operation. The inventor sets forth whether the operation referring to FIG. 8A, 8B is feasible for such selection.

Referring to FIG. 7A-7C, the target block BTm and the subject image incorporated in the superimposition target blocks BR1, . . . , BRp, . . . , BRq are indicated by the oblique lines. The subject image incorporated in the superimposition target blocks BR1, . . . , BRp, . . . , BRq is different from each other. The reason is that each of the superimposition target blocks BR1, . . . , BRp, . . . , BRq is in-place in the different location from others in the frame F0. On the other hand, the subject image incorporated in the target block BTm has a constant pattern.

Some superimposition target blocks BR1, . . . , BRp, . . . , BRq incorporating a different subject image should incorporate the subject image in the target block BTm. The reason is that the frame F0 and the frame F1 are the continuous images, so that a part of the frame F1 must be somewhere in the frame F0. The part corresponding to the target block BTm in the frame F0 must be located in the periphery of the same location as the target block BTm of the frame F0, particularly in the frame F1. The target blocks BT1, BT2, T3, . . . , BTend are acquired right from the periphery thereof. Therefore, some superimposition target blocks BR1, . . . , BRp, . . . , BRq should incorporate the subject image in the target block BTm.

Referring to FIG. 7A, 7C, the fusion blocks BF1, BFq indicate the superimposition results of the target block BTm and the superimposition target block BR1, BRq, which incorporate the subject image having the different pattern from each other. The fusion blocks BF1, BFq are the results of averaging the target block BTm and the superimposition target blocks BR1, BRq. The pattern of the subject images of the superimposed blocks is different from each other, so that the fusion blocks BF1, BFq incorporate a doubling image under the condition in which the thinned subject image incorporated in the target block BTm and the thinned subject image incorporated in the superimposition target blocks BR1, BRq are misaligned from each other. When the subject images are superimposed, the respective subject images are weakened.

Consequently, the contrast values C1, Cq of the fusion blocks BF1, BFq generated by superimposing the target block BTm and the superimposition target block BRm are low, in which each incorporated subject image has the pattern different from each other. The reason is that the incorporated subject image is thin, so that the subject image is hardly discriminated from the background portion other than the subject.

Referring to FIG. 7B, the fusion blocks BFp indicates the superimposition result of the target block BTm and the superimposition target block BRp, which incorporate the subject image having the identical pattern. The patterns of the superimposed subject image are identical, so that the superimposed subject image appears darker in the fusion block BFp. When the subject images are superimposed, the respective subject images are strengthened by each other.

Consequently, the contrast value Cp of the fusion block BFp generated by superimposing the target block BTm and the superimposition target block BRp is high, in which the patterns of both incorporated subject images are identical. The reason is that the incorporated subject image is dark, so that the subject image is well discriminated from the background portion other than the subject.

Specifically, when the selection element 14 calculates and compares the contrast values C1, . . . , Cp, . . . , Cq between the fusion blocks BF1, . . . , BFp, . . . , BFq, and selects the fusion block BFp having the highest contrast, such operation provides the superimposed subject image in which the pattern of the subject image incorporated in the target block BTm of the fusion blocks BF1, ..., BFp, ..., BFq and the pattern of the subject image incorporated in the superimposition target block BRp are identical. In such way, the selection element 14 selects the selection block BS among the multiple fusion blocks, wherein the superimposed subject images are most strengthened each other; At this time, the selection element 14 calculates the value indicating a contrast value C relative to the respective fusion blocks BF and the strengthening level of the superimposed subject images each other by comparing the respective values, and then selects the selection block BF.

[Repeat Operation of Each Element 11, 12, 13, 14]

The operation of each element 11, 12, 13, 14 described above is as to one of the target blocks BT forming the frame F1. Each element 11, 12, 13, 14 generates the selection blocks BS1, BS2, BS3, ..., BSend relative to all target blocks BT1, BT2, T3, ..., BTend constituting the frame F1. The selection element 14 sends out the data defining the generated selection blocks BS1, BS2, BS3, ..., BSend to the image generation element 15 together with the locational data of the corresponding target blocks BT in the frame 1. The image generation element 15 corresponds to the image generation means of the present invention.

(Operation of the Image Generation Element 15)

Figure 9:
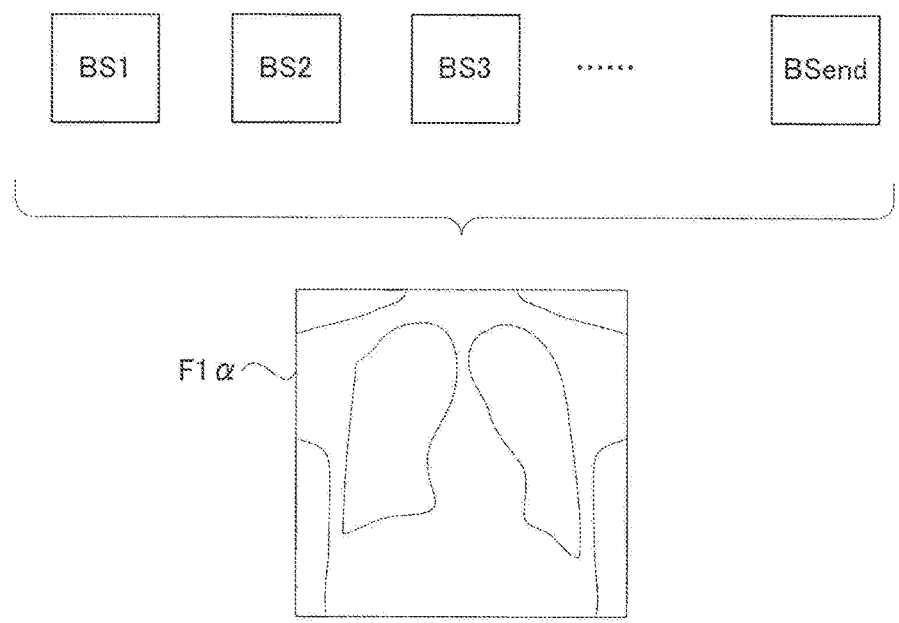
FIG. 9 is a schematic diagram illustrating an operation of an image generation element of the present invention.

Referring to FIG. 9, the image generation element 15 arranges and then connects the selection blocks BSm to generate the noise reduction frame F1α according to the attached locational data. The noise reduction frame F1α is an image as if the noise component is reduced from the frame F1. In such way, the image generation element 15 generates the noise reduction frame F1α, wherein the noise component being incorporated in the frame F1 by connecting the selection blocks BS relative to the respective multiple blocks that the target setting element 11 generates by dividing the frame F1.

[Repetition of the Noise Reduction Frame Generation]

The above description sets forth the operation by which the noise reduction frame F1α relative to the frame F1 is generated. The image processing device 10 is also operative to execute relative to other frame F2 and so forth and to generate the noise reduction frame Fα corresponding thereto one right after the other. FIG. 10 illustrates the mode in which the image processing device 10 generates continuously the noise reduction frame Fα in accordance with generation of the frame F one right after the other. Specifically, with regards to imaging the live image V, when the X-ray radiographic device images the frame F1, the image processing device 10 that receives the frame F1 generates the noise reduction frame F1α based on each frame F0, F1, and when the X-ray radiographic device images the frame F2, the image processing device 10 that receives the frame F2 generates the noise reduction frame F2α based on the frame F1, F2.

Figure 11:
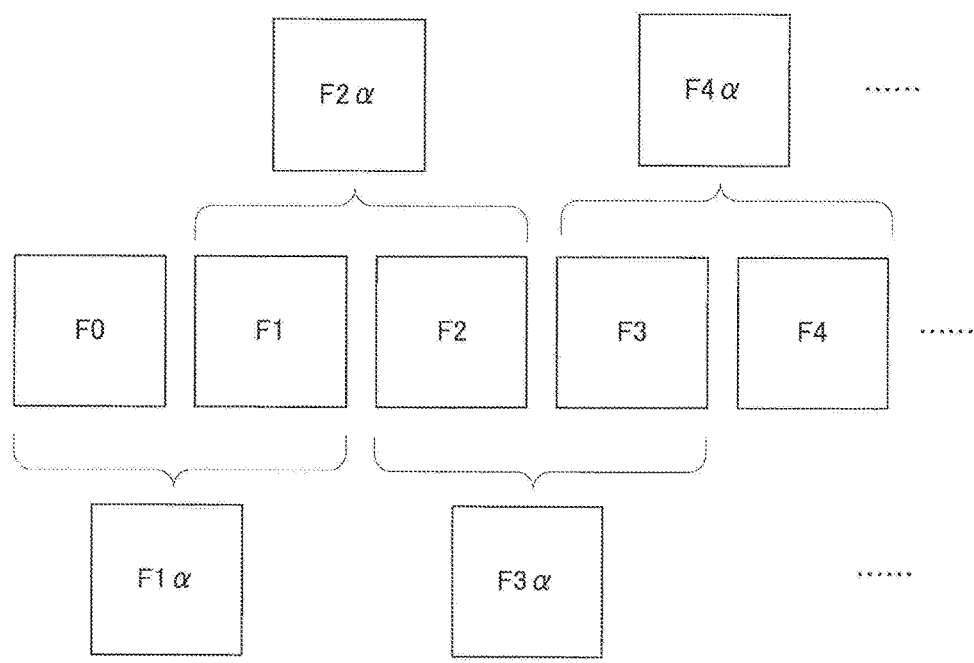
FIG. 11 is a schematic diagram illustrating repetition of an operation of the image processing device of the present invention.

FIG. 11 schematically represents the mode in which the image processing device 10 generates the noise reduction frame Fα one right after the other in accordance with imaging the frame F. The image processing device 10 generates the noise reduction frame by using the updated frame and the frame imaged one frame before the updated frame.

Each element 11, 12, 13, 14, 15 can be brought into reality by executing a variety of programs in CPU. In addition, the image processing device 10 may be brought in reality by multiple processors that execute each element 11, 12, 13, 14, 15 individually.

Action and Effect

As set forth above, according to the aspect of the present invention, an image processing device 10 capable of removing absolutely noises even from a live image having a poor S/N ratio can be provided. Specifically, the image processing device 10 of the present invention sets up a target block BT, which is a part of the frame F1, and multiple superimposition target blocks, which are parts of the frame F0, when the frame F1 and the frame F0 are superimposed; and selects a selection block BS, in which the subject images are most strengthen respectively, from the fusion blocks BF generated by superimposing the target blocks BT to the superimposition target blocks BR respectively. Then, according to the aspect of the present invention, a noise reduction frame F1α is generated by connecting multiple selection blocks BS. In such way, when the target blocks BT are searched out where are in the frame F1, the respective images can be superimposed each other while tracking the subject image in the frame F1, so that the frame F0 is not superimposed to the frame F0 due to an erroneous recognition.

Particularly, according to the aspect of the present invention, the selection element selects a selection block BS among the fusion blocks BF, wherein the superimposed subject images are most strengthened each other; Accordingly, it is advantageous differently from the conventional method.

Specifically, the conventional method may not work well when the S/N ratio of the frame F1 is poor. The method according to the Patent Document 1, however, is not operable to change boldly (extremely) the pixel value in the frame F1. Therefore, the superimposition of respective images is completed while the strong noise in the frame F1 remains as-is. In addition, even if a pattern matching is applied to cancel the noise in the frame F1 absolutely, the accuracy may be poor when the amplitude of the noise is strong.

According to the present invention, the superimposition target blocks BR paring with the target block BT are selected using the benchmark that indicates whether the subject image can be clear based on the superimposition, so that it can be determined whether the subject images are superimposed under the condition in which the noise is reduced. Specifically, the aspect of the present invention is particularly effective on the noise reduction processing relative to the live image having the poor S/N ratio.

When calculate the value indicating the contrast relative to the respective fusion blocks BF and compare the respective values to select the fusion block BF, the selection element selects absolutely the fusion blocks that most strengthen the superimposed subject images each other from multiple fusion blocks BF. The fusion blocks BF that are generated by superimposing the blocks one another incorporating the subject images different from each other have a low-contrast. The reason is that the subject images different from each other weakens one another when superimposing. In contrast, the fusion blocks BF that are generated by superimposing the blocks one another incorporating the same subject images have a high-contrast. The reason is that the same subject images strengthen one another when superimposing. In such way, when compare the fusion blocks BF using a contrast, the selection of the fusion blocks BF is facilitated.

The present invention is not limited to the above structure and further following alternative Embodiment can be implemented.

(1) According to the aspect of the Embodiment 1, the selection element 14 is operative to select by comparing the contrast values in the fusion blocks BF, but the aspect of the present invention is not limited to such aspects. The selection element 14 may be operative by comparing an absolute value of the differential value instead of the contrast value. When calculate the differential value by implementing the differential processing on every respective pixels, which are multiple pixels included in the respective fusion blocks BF, and calculates the representative value (feature quantity), which is the sum or the maximum value of the absolute values of the differential values, which are characteristic, and selects the fusion block having the highest representative value of differential values; the selection element can select absolutely the fusion blocks that most strengthen the superimposed subject images each other from multiple fusion blocks BF. Specifically, the selection element 14 calculates the representative value of the differential values relative to the respective fusion blocks BF and selects the fusion blocks BF by comparing the differential values per se.

The representative value of the differential values obtained even by differentiating the fusion blocks BF that are generated by superimposing the blocks one another incorporating the subject images different from each other is small. The reason is that the subject images different from each other weakens one another when superimposing and the image are unfocused. In contrast, the representative value of the differential values obtained by differentiating the fusion blocks BF that are generated by superimposing the blocks one another incorporating the same subject images is large. The reason is that the same subject images strengthen one another when superimposing are clear. In such way, when compare the fusion blocks using the differential values, the selection of the fusion blocks BF is facilitated.

When comparing the representative value of the differential value relative to two fusion blocks BF, a variety of aspects can be considered. For example, one aspect is that the maximum absolute value of the differential values obtained by differentiating multiple pixels included in one fusion block BF every pixel thereof is acquired, and the maximum absolute value of the differential values obtained by differentiating spatially the other fusion blocks BF; and the obtained maximum values are compared per se. In addition, the absolute values of the differential values can be compared by comparing the average values of absolute values of the differential values between the fusion blocks BF.

In another way, relative to comparison of the fusion blocks, a filtering processing is implemented on the respective fusion blocks BF and the results thereof can be compared, instead of using the differential values. For example, a Laplacian filter, which is applied to calculation of the feature quantity, can be used as the filter shape for such filtering processing and also other kinds of filters can be used.

(2) The aspect of the present invention can be applied to other than the image processing set forth above. An applicable image processing is a recursive filter is applied to generate a noise reduction image. According to the recursive filter, a noise reduction image formed by superimposing the live image frame each other is stored in memory to be as a superimposition target image. And when a new live image frame is input, the new live image and the superimposition target image are superimposed to generate the new noise reduction image that is also stored in addition. Then after, every time when the new frame is input, an operation to superimpose the stored noise reduction images each other is executed and generates the noise reduction image corresponding to the frame one after another. Such recursive filter operation is called a circuit addition process in case. The operation of each element 11, 12, 13, 14, 15 of the present invention can be applied when the frame of the live image and the superimposition target image are superimposed.

INDUSTRIAL APPLICABILITY

As set forth above, the present invention is suitable for medicinal field.

REFERENCE OF SIGNS

11 Target setting element (Target setting means)
12 Superimposition target setting element (superimposition target setting means)
13 Superimposing element (Superimposing means)
14 Selection element (Selection means)
15 Image generation element (Image generation means)

Also, the inventors intend that only those claims which use the complete words "means for" are intended to be interpreted under 35 USC 112, sixth paragraph. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. An image processing device, that processes a noise reduction of an original image by superimposing said original image generated by continuously imaging a subject with time and a superimposition target image, comprising:
   a target setting element that divides at least one part of regions of said original image to multiple blocks and sets up a target block that is one of said multiple blocks;
   a superimposition target setting element that sets up multiple superimposition target blocks, having the same shape and size as said set-up target blocks, in a different location in said superimposition target image from each other;
   a superimposing element that generates fusion blocks by superimposing target blocks to said respective superimposition target blocks;
   a selection element that selects a selection block from said fusion blocks,
   wherein superimposed subject images are most strengthened one another;
   and
   an image generation element that generates a noise reduction image by connecting selection blocks generated relative to said respective multiple blocks.

2. The image processing device, according to claim 1, wherein:
   said selection element calculates a value indicating a contrast relative to said respective fusion blocks, calculates each other's strengthening level of superimposed subject images by comparing said values, and selects said selection blocks.

3. The image processing device, according to claim 1, wherein:
said selection element calculates a feature quantity utilizing a differentiation relative to said respective fusion blocks, calculates each other's strengthening level of the superimposed subject images by comparing the feature quantities, and then selects said selection blocks.

4. The image processing device, according to claim 1, wherein:
said selection element calculates a value indicating a contrast relative to said respective fusion blocks, calculates each other's strengthening level of superimposed subject images by comparing said values, and selects said selection blocks.

5. The image processing device, according to claim 1, wherein:
said superimposition target image is an image generated by continuously imaging said subject and taken one image after said original image.

6. The image processing device, according to claim 1, wherein:
said superimposition target image is said image generated by continuously imaging said subject and a noise reduction image of said image taken one image after said original image.

7. The image processing device, according to claim 1, wherein:
said target setting element sets up rectangular target blocks by dividing said original image vertically and horizontally.

8. The image processing device, according to claim 1, wherein:
said target block that is set up by said target setting element is square.

9. The image processing device, according to claim 1, wherein:
wherein said superimposition target setting element sets up a region at which a center of said region is a location corresponding to said target block in said superimposition target image, sets up said superimposition target blocks while paying attention to a part having the same shape as said target block belonging to said region, and then after sets up one continuously superimposition target blocks while changing a location of said part in said region.

10. The image processing, device according to claim 1, wherein:
said image generation element executes a connection operation by arranging said selection blocks in accordance with locational data of said target blocks corresponding to said selection blocks.

* * * * *